(12) United States Patent
Oyagi et al.

(10) Patent No.: US 8,763,396 B2
(45) Date of Patent: Jul. 1, 2014

(54) CONTROL APPARATUS OF VEHICLE

(75) Inventors: Hiroshi Oyagi, Susono (JP); Yoshio Yamashita, Susono (JP); Kazuki Iwatani, Susono (JP); Taro Aoyama, Susono (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 393 days.

(21) Appl. No.: 13/146,142

(22) PCT Filed: Jan. 26, 2009

(86) PCT No.: PCT/JP2009/051187
§ 371 (c)(1),
(2), (4) Date: Jul. 25, 2011

(87) PCT Pub. No.: WO2010/084616
PCT Pub. Date: Jul. 29, 2010

(65) Prior Publication Data
US 2011/0289919 A1    Dec. 1, 2011

(51) Int. Cl.
| | | |
|---|---|---|
| *F02B 33/44* | (2006.01) | |
| *F02B 33/00* | (2006.01) | |
| *F02B 37/00* | (2006.01) | |
| *F02B 37/007* | (2006.01) | |
| *F02B 37/02* | (2006.01) | |
| *F02B 37/12* | (2006.01) | |
| *F02B 37/16* | (2006.01) | |
| *F02D 9/02* | (2006.01) | |
| *F02D 9/04* | (2006.01) | |
| *F02D 41/00* | (2006.01) | |
| *F02D 41/22* | (2006.01) | |
| *F02M 25/07* | (2006.01) | |
| *F02D 41/04* | (2006.01) | |
| *F02D 41/06* | (2006.01) | |
| *F01N 13/10* | (2010.01) | |

(52) U.S. Cl.
CPC ............... *F02B 37/007* (2013.01); *F02B 37/02* (2013.01); *F02B 37/12* (2013.01); *F02B 37/16* (2013.01); *F02D 9/02* (2013.01); *F02D 9/04* (2013.01); *F02D 41/0007* (2013.01); *F02D 41/22* (2013.01); *F02M 25/0707* (2013.01); *F02M 25/0711* (2013.01); *F02M 25/0728* (2013.01); *F02D 41/042* (2013.01); *F02D 41/062* (2013.01); *F01N 13/107* (2013.01); *Y02T 10/40* (2013.01); *Y02T 10/144* (2013.01)
USPC ........................................... 60/612; 123/562

(58) Field of Classification Search
CPC ........ F02B 37/007; F02B 37/02; F02B 37/12; F02B 37/16; F02D 9/02; F02D 9/04; F02D 41/0007; F02D 41/22; F02D 41/042; F02D 41/062; F02M 25/0707; F02M 25/0711; F02M 25/0728; F01N 13/107; Y02T 10/40; Y02T 10/144
USPC ...................... 60/612, 605.1, 605.2; 123/562; 701/101–104
See application file for complete search history.

(56) References Cited

U.S. PATENT DOCUMENTS

| | | | | |
|---|---|---|---|---|
| 4,428,199 | A * | 1/1984 | Moore et al. | 60/600 |
| 5,987,888 | A * | 11/1999 | Weisman et al. | 60/612 |
| 6,158,219 | A * | 12/2000 | Mailander | 60/612 |
| 7,353,102 | B2 * | 4/2008 | Narita et al. | 60/612 |
| 7,360,356 | B2 * | 4/2008 | Narita et al. | 60/285 |
| 8,051,835 | B2 * | 11/2011 | Soejima et al. | 123/564 |
| 2006/0218899 | A1 * | 10/2006 | Narita et al. | 60/285 |
| 2007/0163258 | A1 * | 7/2007 | Narita et al. | 60/612 |
| 2010/0071658 | A1 * | 3/2010 | Soejima et al. | 123/564 |

FOREIGN PATENT DOCUMENTS

| | | | | | |
|---|---|---|---|---|---|
| JP | 03164525 | A | * | 7/1991 | |
| JP | 03-286144 | A | | 12/1991 | |
| JP | 04-047125 | A | | 2/1992 | |
| JP | 04241731 | A | * | 8/1992 | ............. F02B 37/00 |
| JP | 05-272344 | A | | 10/1993 | |
| JP | 06-346744 | A | | 12/1994 | |
| JP | 11-062604 | A | | 3/1999 | |

| JP | 2003-227362 | A |   | 8/2003 |            |
|----|-------------|---|---|--------|------------|
| JP | 2008175114  | A | * | 7/2008 |            |
| JP | 2008-180176 | A |   | 8/2008 |            |
| JP | 2009030493  | A | * | 2/2009 | F02B 37/007 |
| JP | 2009167961  | A | * | 7/2009 | F02B 37/007 |
| JP | 2010151098  | A | * | 7/2010 |            |
| JP | 2010190053  | A | * | 9/2010 | F02B 37/00 |
| JP | 2010229903  | A | * | 10/2010 | F02B 37/007 |

OTHER PUBLICATIONS

International Search Report of PCT/JP2009/051187 mailed Apr. 14, 2009.

* cited by examiner

Primary Examiner — Thai Ba Trieu
(74) Attorney, Agent, or Firm — Kenyon & Kenyon LLP

(57) ABSTRACT

In a vehicle, which is provided with: a primary turbo and a secondary turbo, each of which is of an exhaust driven type; an exhaust changeover valve and an intake changeover valve, which are placed in a secondary exhaust passage and a secondary intake passage corresponding to the secondary turbo, respectively; and an intake bypass valve placed in an intake bypass passage, an ECU sets the opening/closing state of each changeover valve to an opening/closing state corresponding to a twin turbo mode at the time of engine stop, and it uses the drive control of each changeover valve which is necessitated in the transition to a single turbo mode at the engine start, thereby performing the sticking detection of the changeover valve at the same time.

4 Claims, 3 Drawing Sheets

CONTROL APPARATUS OF VEHICLE

This is a 371 national phase application of PCT/JP2009/051187 filed 26 Jan. 2009, the contents of which are incorporated herein by reference.

TECHNICAL FIELD

The present invention relates to a control apparatus of a vehicle having a supercharging system such as a twin turbo.

BACKGROUND ART

As this type of apparatus, there has been suggested an apparatus for preventing an exhaust changeover valve from sticking (e.g. refer to a patent document 1). According to an abnormality prevention controller of an engine with a supercharger disclosed in the patent document 1, if a valve stick state is predicted by a valve stick state predicting device on the basis of the quantity of state or the operating condition of an engine and a system, the exhaust changeover valve is forcibly driven. Thus, next time the exhaust changeover valve is closed, a contact position between a valve outer circumferential portion and a housing inner circumferential portion changes, so that the valve stick is prevented.

Incidentally, the technique for suppressing the sticking by forcibly driving the exhaust changeover valve is also disclosed in for example a patent document 2.

Moreover, there has been also suggested a technique for suppressing the sticking in a fully-opened or fully-closed state by controlling the exhaust changeover valve and a WGV to have a predetermined intermediate opening degree at the time of engine stop (e.g. refer to a patent document 3).

Patent document 1: Japanese Patent Application Laid Open No. Hei 4-47125

Patent document 2: Japanese Patent Application Laid Open No. Hei 5-272344

Patent document 3: Japanese Patent Application Laid Open No. 2008-180176

DISCLOSURE OF INVENTION

Subject to be Solved by the Invention

However, in the technique disclosed in the patent document 1 and the patent document 2, the exhaust changeover valve is forcibly driven during engine operation so as to prevent the sticking of the exhaust changeover valve; however, from the practical viewpoint, there is no guarantee that the sticking is surely avoided by this type of forcible driving. Therefore, although the frequency of the sticking decreases, the potential for the sticking will not be zero.

Such a problem is the same for the technique disclosed in the patent document 3. Even if the sticking of the exhaust changeover valve in the fully-closed state is avoided, after all, the potential for the sticking having the intermediate opening degree will not be zero. In other words, in a vehicle provided with a plurality of superchargers, it is important to detect the sticking at the same time with the prevention of the sticking.

On the other hand, from the viewpoint of the sticking detection, in any of the aforementioned techniques, the sticking is detected during engine operation, and the sticking of the exhaust changeover valve can be a factor causing an unexpected performance degradation of the superchargers. Moreover, if it is tried to realize a plurality of supercharging modes, preferably, the cooperative operation of not only the exhaust changeover valve but also various changeover valves is required. However, the various changeover valves also have the potential for the sticking in the same manner, and it is uncertain which valve will have the sticking. If the sticking of various changeover valves is detected during engine operation, for example, a reduction in drivability caused by a reduction in supercharging pressure, a supercharger overshoot, a compressor surge etc. are hardly avoided, practically sufficiently.

On the other hand, it is relatively easy to detect the sticking by performing this type of forcible driving at the start of an internal combustion engine when a vehicle is not still in significant state of motion in order to address such a problem, and there is no special difficulty in its practice. However, if the forcible driving of the various changeover valves is performed at the start, the opening/closing state of the various changeover valves has no connection, even temporarily, to an optimized opening/closing state which is to be originally adopted by the changeover valves. In other words, so to speak, for the purpose of the sticking detection, an energy resource required for the driving of the changeover valves is wasted and the performance of the superchargers is degraded, so that it is not desirable at all in terms of efficiency.

As described above, the technical ideas which can be reached from the aforementioned various conventional techniques or technologies have such a problem that it is extremely hard to efficiently detect the sticking while preventing the sticking. Moreover, those technical ideas have a lack of fail-safe concept, and even if the sticking is detected regardless of its efficiency, it is hard to avoid a severe reduction in vehicle performance.

In view of the aforementioned problems, it is therefore an object of the present invention to provide a control apparatus of a vehicle, which efficiently detects the sticking while preventing the sticking of the various changeover valves related to the operations of the plurality of superchargers and which can realize a preferable fail-safe.

Means for Solving the Subject

The above object of the present invention can be achieved by a control apparatus of a vehicle, the vehicle provided with: an internal combustion engine; a supercharging system including a first supercharger and a second supercharger each of which is driven by an exhaust air of the internal combustion engine; and at least one changeover valve which is placed in at least one of an intake passage and an exhaust passage of the internal combustion engine and which can change a supercharging mode associated with the supercharging system among a plurality of supercharging modes including a single supercharging mode for performing supercharging only with the first supercharger and a twin supercharging mode for performing supercharging with both the first and second superchargers, in accordance with an opening/closing state, the control apparatus provided with: a first controlling device for controlling the changeover valve at the time of engine stop of the internal combustion engine such that the opening/closing state is an opening/closing state corresponding to a supercharging mode which is different from a supercharging mode to be selected at the start of the internal combustion engine from among the plurality of supercharging modes; and a second controlling device for controlling the changeover valve at the start of the internal combustion engine such that the opening/closing state is an opening/closing state corresponding to the supercharging mode to be selected at the start.

Each of the first supercharger and the second supercharger of the present invention is configured as a supercharger of an exhaust driven type, such as a so-called turbocharger, for driving a supercharging device such as a compressor placed in the intake passage, by using exhaust energy recovery equipment such as a turbine placed in the exhaust passage of the internal combustion engine. At this time, the position relation between the first and second superchargers is not particularly limited, and the first and second superchargers may be placed in parallel with each other to constitute a so-called parallel twin turbo, or they may be placed in series with each other to constitute a so-called series twin turbo. Incidentally, the number of the superchargers owned by the supercharging system of the present invention is also arbitrary, and it is not necessarily limited to two (twin turbo).

In the present invention, the supercharging mode associated with the supercharging system is changed, as occasion demands, in accordance with the opening/closing state of the changeover valve(s), which may be various valve apparatuses, such as a butterfly valve and an electromagnetic valve, each of which has a valve disc placed at a position suitable for its role, such as an exhaust passage, an intake passage or a bypass passage, and whose the opening/closing state is variable in a binary, gradual or continuous manner.

Here, the changeover valve having those various aspects sometimes goes into a sticking state due to various products which can be generated in the operations of the internal combustion engine, such as various deposits and moisture, or due to uncertain factors which can occur in its physical, mechanical, or electrical structure. Incidentally, the "sticking state" is a state in which a smooth opening/closing operation to be expected in advance is inhibited, and it is not necessarily limited to that the valve disc cannot turn at all. Moreover, it is a concept including freezing which occurs mainly in cold time.

The control apparatus of the vehicle of the present invention operates as follows, in order to efficiently detect the sticking while preventing this type of sticking; namely, the first controlling device, which can adopt various processing units such as an ECU (Electronic Control Unit), various controllers, or various computer systems such as a microcomputer apparatus, controls the changeover valve at the time of engine stop of the internal combustion engine such that the opening/closing state of the changeover valve is the opening/closing state corresponding to the supercharging mode which is different from the supercharging mode to be selected at the start of the internal combustion engine from among the supercharging modes associated with the supercharging system.

On the other hand, the second controlling device, which can adopt various processing units such as an ECU, various controllers, or various computer systems such as a microcomputer apparatus, controls the changeover valve at the start of the internal combustion engine such that the opening/closing state of the changeover valve is the opening/closing state corresponding to the supercharging mode to be selected at the start, in response to the control operation of controlling the changing device associated with the first controlling device.

Here, at the start of the internal combustion engine, if it is tried to detect the sticking at the start when the changeover valve is already in the opening/closing state to be adopted at the start, then, the completely inefficient operation of the changeover valve as described above is inevitably necessitated.

However, according to the present invention, one or a plurality of changeover valves are driven-controlled so as to be engine-stopped in the opening/closing state which is different from the opening/closing state to be adopted at the start, so that the sticking detection is also performed in the process that the changeover valve is driven-controlled toward the optimized opening/closing state at the start. The drive control of the changeover valve as described above is reasonable driving toward the opening/closing state to be originally adopted, and it is essentially different from wasteful driving in which the energy resource is wasted.

In other words, according to the present invention, preparations for the sticking detection at the restart are already made at the time of engine stop, and it has a definite advantage over any technical ideas in which the sticking detection process does not start until the restart.

Here, in particular, the control of the first controlling device seemingly drives the changeover valve which is to be performed at the start of the internal combustion engine, ahead of schedule, which is merely at the time of engine stop. However, in examining this from the point that the sticking of the changeover valve can remarkably occur during the engine stop and the point of fail-safe of the vehicle when the sticking occurs, an advantage worthy of special mention can be found in the operation of the first controlling device In other words, in the supercharging system provided with the plurality of superchargers, in an operating area which has a low engine rotational speed and a light load and in which exhaust energy is relatively small to be recovered, such as at the start, the number of the superchargers which are in an operation state is desirably low, and the single supercharging mode using only the first supercharger is preferably selected. To put it another way, there is a tendency to prioritize supercharging response characteristics over the limit value of the supercharging pressure at the start. Therefore, if the changeover valve is stuck in the opening/closing state corresponding to the supercharging mode to be adopted at the start, the performance of the supercharging system is remarkably limited.

On the other hand, for example, in another supercharging mode such as the twin supercharging mode using both the first and second superchargers, which can be selected except for at the start, it is possible to use the exhaust energy regardless of its magnitude, and of course, although the response of the supercharging pressure in a low revolution area or light load area becomes slow, its limit supercharging pressure is sufficiently high in comparison with the supercharging mode to be adopted at the start. In other words, even if the changeover valve is stuck in the opening/closing state corresponding to the supercharging mode which can be selected except for at the start, the performance of the supercharging system is not considerably limited from the practical viewpoint.

In other words, according to the present invention, not only the efficient sticking detection when the internal combustion engine restarts but also the suppression of the reduction in vehicle performance when the sticking occurs are considered at the time of engine stop, and an extremely useful fail-safe in practice is realized. Incidentally, in that the changeover valve surely having the sticking detection effect is driven at the start of the internal combustion engine, it goes without saying that the control apparatus of the vehicle of the present invention has also an effect of preventing the sticking.

In one aspect of the control apparatus of the vehicle of the present invention, the supercharging system is a parallel supercharging system in which each of the first and second superchargers can independently perform supercharging, and the changeover valve includes at least an exhaust changeover valve placed in the exhaust passage corresponding to the second supercharger and an intake changeover valve placed in the intake passage corresponding to the first supercharger.

According to this aspect, in the parallel supercharging system in which the single supercharging mode is realized by fully closing both the intake changeover valve and the exhaust changeover valve and in which the twin supercharging mode is realized by fully opening both the intake changeover valve and the exhaust changeover valve, it is possible to prevent and efficiently detect the sticking of each of the changeover valves.

Incidentally, in this aspect, the first controlling device may control each of the exhaust changeover valve and the intake changeover valve to be in a fully-opened state at the time of engine stop, and the second controlling device may control each of the exhaust changeover valve and the intake changeover valve to be in a fully-closed state at the start.

In this type of parallel supercharging system, the single supercharging mode using only the first supercharger is relatively easily realized by closing the intake changeover valve to close the intake passage corresponding to the second supercharger and by closing the exhaust changeover vale to close the exhaust passage corresponding to the second supercharger. On the other hand, the twin supercharging mode in which the first and second superchargers are in an operation state is relatively easily realized by opening the intake changeover valve to open the intake passage corresponding to the second supercharger and by opening the exhaust changeover vale to open the exhaust passage corresponding to the second supercharger.

Here, if the changeover valves are driven-controlled as described above, the twin supercharging mode is selected at the time of engine stop, and the single supercharging mode is selected at the start. In other words, even if the sticking occurs, the supercharging mode of the supercharging system is the twin supercharging mode, and it is possible to obtain the effect of the supercharging in a wide operating area from the low revolution area or light load area to a high revolution area or a high load area.

In one aspect of the control apparatus of the vehicle of the present invention, it is further provided with: a specifying device for specifying the opening/closing state; and a judging device for judging whether or not the changeover valve is in a sticking state on the basis of the specified opening/closing state when the opening/closing state is controlled, at the start, to be in the opening/closing state corresponding to the supercharging mode to be selected at the start.

According to this aspect, it can be easily and accurately judged whether or not the changeover valve is in the sticking state, by the judging device which can adopt various processing units such as an ECU, various controllers, or various computer systems such as a microcomputer apparatus, on the basis of the opening/closing state of the changeover valve specified by the specifying device which can adopt various processing units such as an ECU, various controllers, or various computer systems such as a microcomputer apparatus.

Moreover, the specification of the opening/closing state by the specifying device facilitates the specification of the changeover valve which is in the sticking state, regardless of the number of the changeover valves provided for the supercharging system. Thus, it is easy and possible to take a desirable fail-safe measure in cases where it is judged that at least one portion of the changeover valves is in the sticking state.

Incidentally, the wording of "specify" in the present invention is a general concept with various practical aspects, such as detect, estimate, identify, calculate, and obtain.

The operation and other advantages of the present invention will become more apparent from the embodiment explained below.

Figure 1:
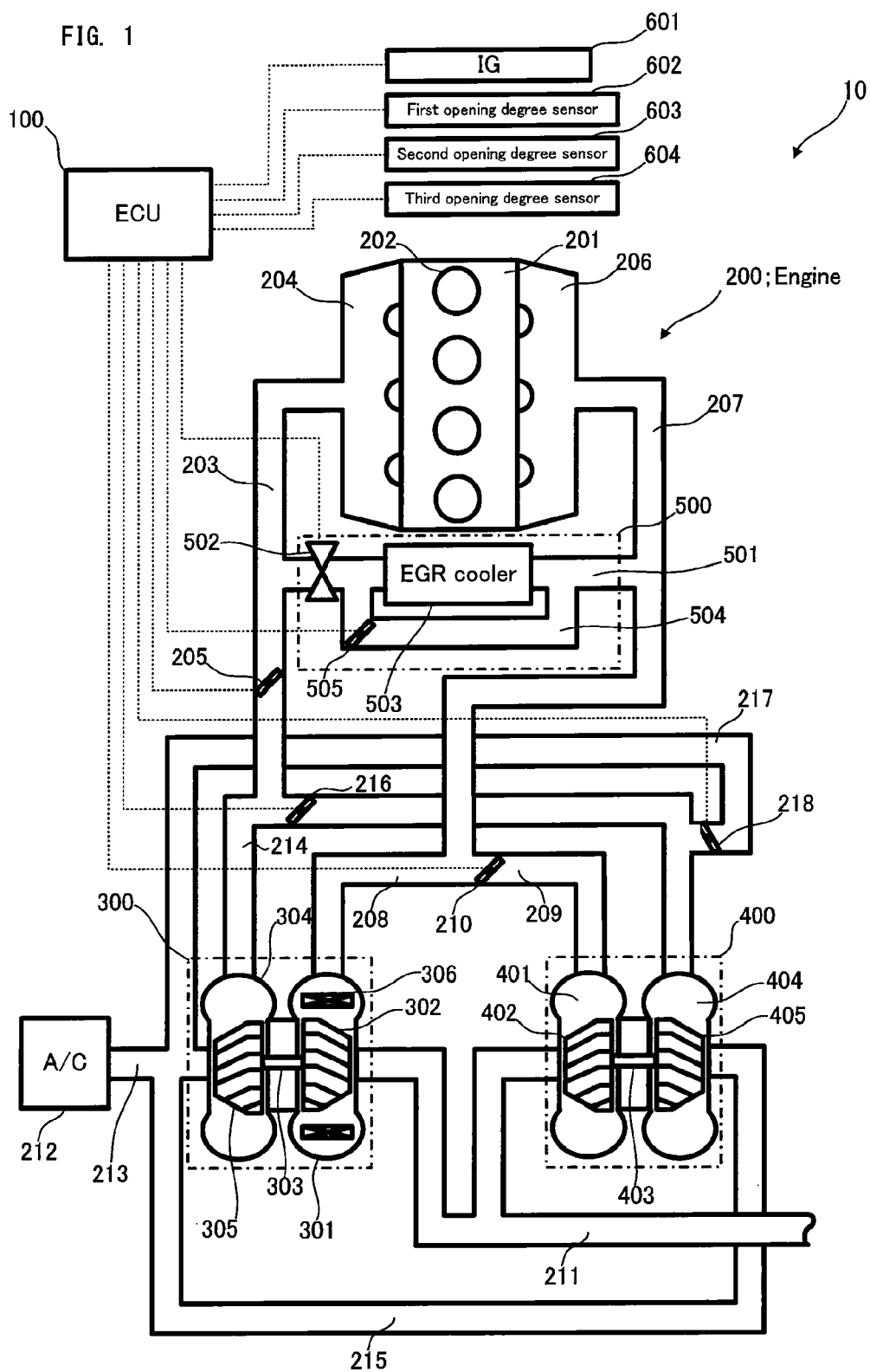
FIG. 1 is a schematic diagram showing an engine system in one embodiment of the present invention.

DESCRIPTION OF REFERENCE CODES 10 engine system
100 ECU
200 engine
210 exhaust changeover valve
216 intake changeover valve
217 intake bypass passage
218 intake bypass valve
300 primary turbo
400 secondary turbo
500 EGR apparatus
601 IG
602 first opening degree sensor
603 second opening degree sensor
604 third opening degree sensor

BEST MODE FOR CARRYING OUT THE INVENTION

Embodiment of the Invention

Hereinafter, a preferred embodiment of the present invention will be explained with reference to the drawings.

Structure of Embodiment

Firstly, with reference to FIG. 1, the structure of an engine system in one embodiment of the present invention will be explained. FIG. 1 is a schematic diagram showing an engine system 10.

In FIG. 1, the engine system 10 is installed in a not-illustrated vehicle, and it is provided with an ECU 100, an engine 200, a primary turbo 300, a secondary turbo 400 and an EGR apparatus 500.

The ECU 100 is an electronic control unit which is provided with a CPU (Central Processing Unit), a ROM (Read Only Memory), a RAM (Random Access Memory), or the like, and which can control all the operations of the engine system 10. The ECU 100 is one example of the "control apparatus of the vehicle" of the present invention. The ECU 100 can perform engine stop control and engine start control described later, in accordance with a control program stored in the ROM.

Incidentally, the ECU 100 is a unified or one-body electronic control unit which functions as one example of each of the "first controlling device", the "second controlling device", the "specifying device" and the "judging device" of the present invention. The physical, mechanical, and electrical configuration of each device of the present invention is not limited to this, and it may be also configured for example as various computer systems, such as microcomputer apparatuses, various controllers, various processing units, and a plurality of ECUs.

The engine 200 is an in-line four-cylinder gasoline engine as one example of the "internal combustion engine" of the present invention, in which four cylinders 202 are distributed in series with each other in a cylinder block 201.

In the engine 200, an intake air guided to a second main intake passage 203 is mixed with gasoline which is sprayed by a not-illustrated injector in the process that the intake air is guided to not-illustrated intake ports each of which correspond to respective one of the cylinders and an intake manifold 204 communicated with the second main intake passage 203, and it is sucked as an air-fuel mixture into each cylinder at the time of the opening of a not-illustrated intake valve. At this time, the flow of the intake air in the second main intake passage 203 is adjusted in accordance with the opening/closing state of an electronically-controlled throttle valve 205.

This air-fuel mixture is ignited and burnt by spark ignition by a not-illustrated igniter in a combustion stroke of each cylinder, and it is emitted as an exhaust air to not-illustrated exhaust ports each of which correspond to respective one of the cylinders at the time of the opening of a not-illustrated exhaust valve in an exhaust stroke of each cylinder.

On the other hand, an exhaust manifold 206 is connected to the exhaust ports, and each of the exhaust ports is communicated with the exhaust manifold in the inside thereof. The exhaust air collected in the exhaust manifold 206 is guided to a first main exhaust passage 207. The first main exhaust passage 207 branches into a primary exhaust passage 208 and a secondary exhaust passage 209 at branch positions on the downstream side.

In the primary exhaust passage 208, a primary turbine housing 301 is placed, and a primary turbine 302 is accommodated therein. The primary turbine 302 is exhaust energy (exhaust heat or exhaust pressure) recovery equipment, which is rotationally driven by the exhaust air with a turbine rotating shaft 303 as a rotating shaft. In particular, in the primary turbine housing 301, a known VN (Variable Nozzle) 306 is placed which can adjust the amount of the exhaust air supplied to the primary turbine 302 by making the communication area of its upstream and downstream variable in accordance with the opening degree of a nozzle vane.

In the secondary exhaust passage 209, a secondary turbine housing 401 is placed, and a secondary turbine 402 is accommodated therein. The secondary turbine 402 is exhaust energy (exhaust heat or exhaust pressure) recovery equipment, which is rotationally driven by the exhaust air with a turbine rotating shaft 403 as a rotating shaft.

Moreover, in the secondary exhaust passage 209, an exhaust changeover valve 210 is placed. The exhaust changeover valve 210 is a known butterfly valve having a valve disc which can turn in the secondary exhaust passage 209, and it is one example of the "changeover valve" of the present invention. The exhaust changeover valve 210 is provided with a not-illustrated actuator (motor and its driving apparatus) electrically connected to the ECU 100, and the valve disc is configured such that its position is controlled continuously variably between a fully-closed position at which the secondary exhaust passage 209 is closed and a fully-opened position at which the secondary exhaust passage 209 is opened, in response to the supply of a driving force from the actuator. Incidentally, the opening degrees of the exhaust changeover valve 210 corresponding to the fully-opened position and the fully-closed position will be hereinafter referred to as a "fully-opened opening degree" and a "fully-closed opening degree", respectively, as occasion demands.

The primary exhaust passage 208 and the secondary exhaust passage 209 join a second main exhaust passage 211 in junction sites located on the downstream side of the primary turbine 302 and the secondary turbine 402, respectively. The second main exhaust passage 211 is connected to a not-illustrated catalytic device.

On the other hand, in the engine 200, the intake air sucked from the external world is purified by an air cleaner 212 and then guided to a first main intake passage 213. The first main intake passage 213 branches into a primary intake passage 214 and a secondary intake passage 215 at branch positions on the downstream side.

In the primary intake passage 214, a primary compressor housing 304 is placed, and a primary compressor 305 is accommodated therein. The primary compressor 305 is a fluid compressing apparatus coupled with the aforementioned turbine rotating shaft 303, and it is rotationally driven with the primary turbine 302 in a substantially unified manner, with the turbine rotating shaft 303 as a rotating shaft. The primary compressor 305 is basically configured such that it can supercharge the intake air at a supercharging pressure according to its rotational speed. The primary compressor housing 304 and the primary compressor 305 constitute the primary turbo 300, together with the primary turbine housing 301, the primary turbine 302, the turbine rotating shaft 303 and the VN 306 described above. The primary turbo 300 is one example of the "first supercharger" of the present invention.

In the secondary intake passage 215, a secondary compressor housing 404 is placed, and a secondary compressor 405 is accommodated therein. The secondary compressor 405 is a fluid compressing apparatus coupled with the aforementioned turbine rotating shaft 403, and it is rotationally driven with the secondary turbine 402 in a substantially unified manner, with the turbine rotating shaft 403 as a rotating shaft. The secondary compressor 405 is basically configured such that it can supercharge the intake air at a supercharging pressure according to its rotational speed. The secondary compressor housing 404 and the secondary compressor 405 constitute the secondary turbo 400, together with the secondary turbine housing 401, the secondary turbine 402 and the turbine rotating shaft 403 described above. The secondary turbo 400 is one example of the "second supercharger" of the present invention.

Moreover, on the downstream side of the secondary compressor 405 in the secondary intake passage 215, an intake changeover valve 216 is placed. The intake changeover valve 216 is a known butterfly valve having a valve disc which can turn in the secondary intake passage 205, and it is another example of the "changeover valve" of the present invention. The intake changeover valve 216 is provided with a not-illustrated actuator (motor and its driving apparatus) electrically connected to the ECU 100, and the valve disc is configured such that its position is controlled continuously variably between a fully-closed position at which the secondary intake passage 205 is closed and a fully-opened position at which the secondary intake passage 205 is opened, in response to the supply of a driving force from the actuator. Incidentally, the opening degrees of the intake changeover valve 216 corresponding to the fully-opened position and the fully-closed position will be hereinafter referred to as a "fully-opened opening degree" and a "fully-closed opening degree", respectively, as occasion demands. Incidentally, the secondary intake passage 215 joins and is connected to the aforementioned second main intake passage 203, together with the primary intake passage 214 at a junction position on the downstream side of the intake changeover valve 216.

On the other hand, one end of an intake bypass passage 217 is connected to the downstream side of the secondary compressor 405 and the upstream side of the intake changeover valve 216 in the secondary intake passage 215. The other end of the intake bypass passage 217 is connected to the vicinity of the aforementioned branch position in the first main intake passage 213. The intake bypass passage 217 allows the primary intake passage 214 and the secondary intake passage 215 to be communicated with each other.

In the intake bypass passage 217, an intake bypass valve 218 is placed. The intake bypass valve 218 is a known butterfly valve having a valve disc which can turn in the intake bypass passage 217, and it is another example of the "changeover valve" of the present invention. The intake bypass valve 218 is provided with a not-illustrated actuator (motor and its driving apparatus) electrically connected to the ECU 100, and the valve disc is configured such that its position is controlled continuously variably between a fully-closed position at which intake bypass passage 217 is closed and a fully-opened position at which the intake bypass passage 217 is opened, in response to the supply of a driving force from the actuator. Incidentally, the opening degrees of the intake bypass valve 218 corresponding to the fully-opened position and the fully-closed position will be hereinafter referred to as a "fully-opened opening degree" and a "fully-closed opening degree", respectively, as occasion demands.

The EGR apparatus 500 is an exhaust circulating apparatus which is provided with an EGR passage 501, an EGR valve 502, an EGR cooler 503, an EGR cooler bypass passage 504 and an EGR cooler bypass valve 505.

The EGR passage 501 is a metallic tubular member whose one end is connected to the first main exhaust passage 207. The other end of the EGR passage 501 is connected to the downstream side of the throttle valve 205 in the second main intake passage 203. Thus, the exhaust air emitted to the first main exhaust passage 207 is configured such that its one portion is circulated as an EGR gas through the second main intake passage 203.

The EGR valve 502 is a valve apparatus, placed in the EGR passage 501 and which can gradually control the supply of the EGR gas in accordance with the communication areas of the up and down streams of the EGR valve 502 determined by the position of a valve disc. The valve disc of the EGR valve 502 is driven in accordance with the target value of an EGR rate, by a not-illustrated stepping motor which is electrically connected to the ECU 100.

The EGR cooler 503 is an EGR gas cooling apparatus, placed on the EGR passage 501. The EGR cooler 503 has such a structure that one portion of the coolant circulatory system of the engine 200 is laid around its outer circumferential portion and that it can cool the EGR gas which passes through the installation section of the EGR cooler 503 in the EGR passage 501 by heat exchange with the coolant.

The EGR cooler bypass passage 504 is a tubular member which branches from the upstream side of the EGR cooler 503 in the EGR passage 501 and which joins the EGR passage 501 again on the downstream side of the EGR cooler 503. In the EGR cooler bypass passage 504, the EGR cooler bypass valve 505 is placed, and the circulation path of the EGR gas can be changed between a cooling path which goes through the EGR cooler 503 and a non-cooling path which bypasses the EGR cooler 503.

The engine system 10 has an IG switch 601, a first opening degree sensor 602, a second opening degree sensor 603 and a third opening degree sensor 604.

The IG switch 601 is a switch capable of starting and stopping the engine 200, and it can be operated by the driver of the vehicle, as occasion demands. Incidentally, in the embodiment, a state in which the IG switch 601 is operated to request the start of the engine 200 is referred to as an "IG ON state", and a state in which the IG switch 601 is operated to request the stop of the engine 200 is referred to as an "IG OFF state", as occasion demands.

The first opening degree sensor 602 is a sensor capable of detecting the opening degree of the exhaust changeover valve 210. The first opening degree sensor 602 is electrically connected to the ECU 100, and the detected opening degree of the exhaust changeover valve 210 is referred to by the ECU 100 with a constant or irregular period.

The second opening degree sensor 603 is a sensor capable of detecting the opening degree of the intake changeover valve 216. The second opening degree sensor 603 is electrically connected to the ECU 100, and the detected opening degree of the intake changeover valve 216 is referred to by the ECU 100 with a constant or irregular period.

The third opening degree sensor 604 is a sensor capable of detecting the opening degree of the intake bypass valve 218. The third opening degree sensor 604 is electrically connected to the ECU 100, and the detected opening degree of the intake bypass valve 218 is referred to by the ECU 100 with a constant or irregular period.

Operations of Embodiment

Figures 2, 3:
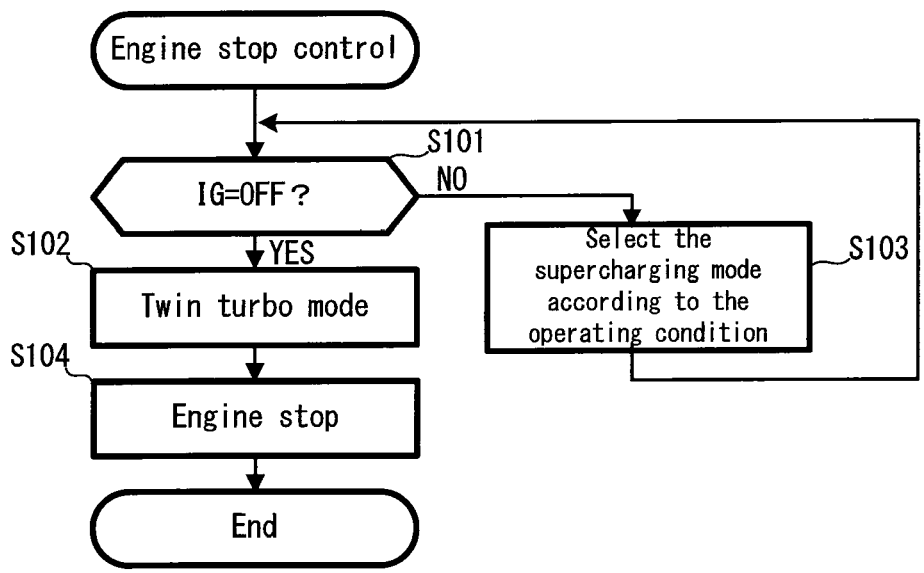
FIG. 2 is a list showing a correspondence relation between a control state of each changeover valve and a supercharging mode in the engine system in FIG. 1.
FIG. 3 is a flowchart showing engine stop control performed by an ECU in the engine system in FIG. 1.

In the engine system 10, two types of supercharging modes are selectively changed by the cooperation control of the exhaust changeover valve 210, the intake changeover valve 216 and the intake bypass valve 218. Now, with reference to FIG. 2, an explanation will be given on a correspondence relation between the opening/closing state of each changeover valve and the supercharging mode. FIG. 2 is a list showing the correspondence relation.

As shown in FIG. 2, if the exhaust changeover valve 210 and the intake changeover valve 216 adopt the fully-closed opening degree and the intake bypass valve 218 adopts the fully-opened opening degree, then, a single turbo mode is realized.

In the single turbo mode, the exhaust changeover valve 210 has the fully-closed opening degree, and thus the supply of the exhaust air to the secondary turbine 402 is cut off. Thus, the secondary compressor 405 coupled with the secondary turbine 402 via the turbine rotating shaft 403 is not rotationally driven, which causes the secondary turbo 400 to be in a non-operation state. In other words, in the engine system 10, what contributes to the supercharging is only the primary turbo 300.

Here, since the secondary turbo 400 is in the non-operation state, if the primary intake passage 214 and the secondary intake passage 215 are communicated with each other, then, one portion of the intake air supercharged by the primary turbo 300 does not go to the secondary main intake passage 203 but flows backward into the secondary intake passage 215 toward the first main intake passage 213, which reduces the supercharging pressure. Thus, in the single turbo mode, the intake changeover valve 216 has the fully-closed opening degree, and the communication between the primary intake passage 214 and the secondary intake passage 215 is cut off.

Moreover, even in the state that the communication between the primary intake passage 214 and the secondary intake passage 215 is cut off as described above, the communication between the first main intake passage 213 and the secondary intake passage 215 is not cut off, so that there is a possibility that one portion of the intake air flows into the secondary compressor 405 according to circumstances. At this time, if the flown intake air has no place to go to, the secondary compressor 402 possibly causes a compressor surge. In other words, in the single turbo mode, it is necessary to let the air flown into the secondary compressor 405 escape in a proper path. That is why the intake bypass valve 218 has the fully-opened opening degree and this type of air is returned to the first main intake passage 213 as occasion demands.

On the other hand, in FIG. 2, if the exhaust changeover valve 210 and the intake changeover valve 216 adopt the fully-opened opening degree and the intake bypass valve 218 adopts the fully-closed opening degree, a twin turbo mode is realized.

In the twin turbo mode, the exhaust changeover valve 210 has the fully-opened opening degree, and thus the exhaust air is supplied to the secondary turbine 402 as in the primary turbine 302. Thus, the secondary compressor 405 coupled with the secondary turbine 402 via the turbine rotating shaft 403 is rotationally driven, which causes the secondary turbo 400 to be in an operation state. In other words, both the primary turbo 300 and the secondary turbo 400 contribute to the supercharging.

Here, if the intake bypass valve 218 is in a valve opening state, one portion of the intake air especially supercharged by the secondary turbo 400 escapes to the first main intake passage 213. In order to prevent this situation, in the twin turbo mode, the intake bypass valve 218 has the fully-closed opening degree, and the communication between the intake bypass passage 217 and the first main intake passage 213 is cut off. As described above, the opening/closing state of each changeover valve is opposite in the single turbo mode and the twin turbo mode.

In the single turbo mode, only the primary turbo 300 is in the operation state, so that the upper limit value of the reachable supercharging pressure of the engine system 10 is relatively lower than in the twin turbo mode. However, the secondary turbine 402 does not have to be driven by the exhaust air, and thus the rising rate of the supercharging is better than in the twin turbo mode. Therefore, the single turbo mode is selected in a low revolution or light load operating area, including at the start of the engine 200.

In contrast, in the twin turbo mode, both the primary turbo 300 and the secondary turbo 400 are in the operation state, so that the upper limit value of the reachable supercharging pressure of the engine system 10 is relatively higher than in the single turbo mode. However, in the twin turbo mode, the secondary turbine 402 needs to be driven in addition to the primary turbine 302, and thus it needs a larger exhaust energy than in the single turbo mode. Thus, the twin turbo mode is selected in a high revolution or high load operating area.

Incidentally, in the embodiment, it is assumed that the supercharging modes in the engine system 10 are only the single turbo mode and the twin turbo mode; however, this is of course one example, and for example a run-up twin turbo mode may be provided between the single turbo mode and the twin turbo mode, wherein the run-up twin turbo mode is to run up the secondary turbo 400 by maintaining each of the exhaust changeover valve 210 and the intake changeover valve 216 to the intermediate opening degree which is not unique. In the run-up twin turbo mode, each of the reachable supercharging pressure and the rising rate of the supercharging is located between the single turbo mode and the twin turbo mode.

Here, if the exhaust changeover valve 210, the intake changeover valve 216 or the intake bypass valve 218 is stuck to cause a malfunction in the engine system 10 described above, there is a possibility that various failures will occur, such as a reduction in supercharging pressure, the compressor surge of the secondary turbo 400, or the overshoot of the primary turbo 300, depending on the type of the stuck changeover valve. Thus, the sticking of each changeover valve needs to be detected, quickly, accurately and efficiently.

The ECU 100 performs engine stop control and engine start control in order to detect this type of sticking. Now, with reference to FIG. 3, firstly, the details of the engine stop control will be explained. FIG. 3 is a flowchart showing the engine stop control. Incidentally, the engine stop control is performed in the operation period of the engine 200.

In FIG. 3, the ECU 100 judges whether or not the operating state of the IG switch 601 is in the IG OFF state, i.e. whether or not there is an engine stop request (step S101).

If there is no engine stop request (the step S101: NO), the ECU 100 selects the supercharging mode in accordance with the operating condition of the vehicle as described above and drive-controls the exhaust changeover valve 210, the intake changeover valve 216 and the intake bypass valve 218 so as to obtain the opening/closing state corresponding to the selected supercharging mode (step S103). If the step S103 is performed, the process is returned to the step S101.

On the other hand, if there is the engine stop request (the step S101: YES), the ECU 100 selects the twin turbo mode as the supercharging mode (step S102). In other words, the exhaust changeover valve 210 and the intake changeover valve 216 are controlled to have the fully-opened opening degree, and the intake bypass valve 218 is controlled to have the fully-closed opening degree. Incidentally, the twin turbo mode corresponds to the "supercharging mode which is different from the supercharging mode to be selected at the start of the internal combustion engine" in the present invention.

If the twin turbo mode is selected as the supercharging mode, the ECU 100 controls the engine to be in an engine stop state (step S104) and ends the engine stop control.

Figure 4:
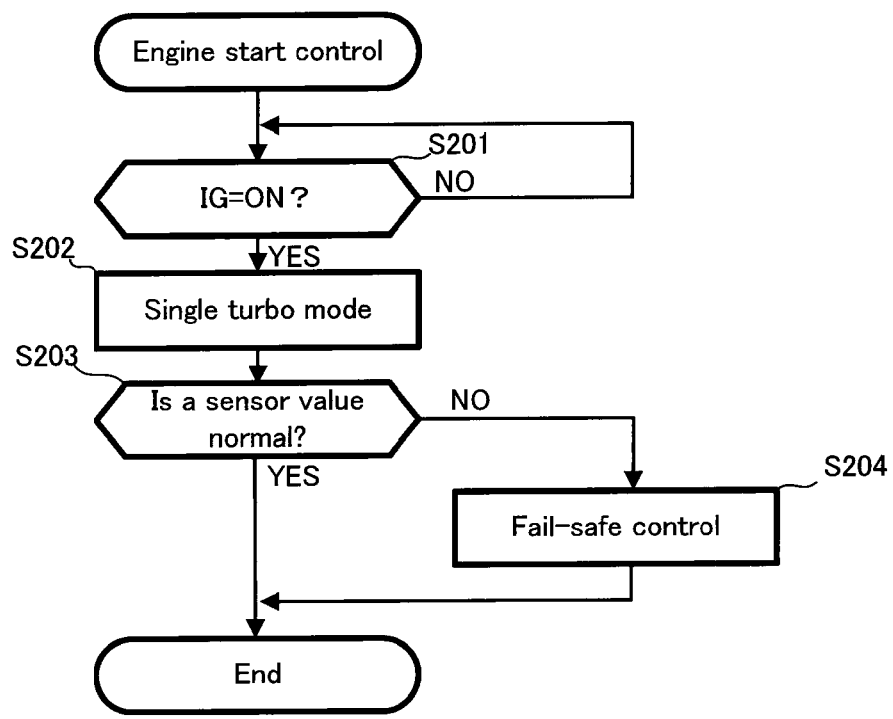
FIG. 4 is a flowchart showing engine start control performed by the ECU in the engine system in FIG. 1.

Next, with reference to FIG. 4, the details of the engine start control will be explained. FIG. 4 is a flowchart showing the engine start control. Incidentally, the engine start control is performed when the engine 200 is in the engine stop state.

In FIG. 4, the ECU 100 judges whether or not the operating state of the IG switch 601 is in the IG ON state, i.e. whether or not there is an engine start request (step S201).

If there is no engine start request (the step S201: NO), the ECU 100 substantially holds the process.

On the other hand, if there is the engine start request (the step S201: YES), the ECU 100 selects the single turbo mode as the supercharging mode (step S202). Incidentally, the single turbo mode corresponds to the "supercharging mode to be selected at the start of the internal combustion engine" in the present invention.

Here, in the aforementioned engine stop control, the opening/closing state of each changeover valve at the time of engine stop is the opening/closing state corresponding to the twin turbo mode. Thus, in the step S202, the driving is started such that the exhaust changeover valve 210, the intake changeover valve 216 and the intake bypass valve 218 will be in the fully-closed state, the fully-closed state, and the fully-opened state as their target states, respectively.

On the other hand, when performing the step S202, the ECU obtains the sensor outputs of the first opening degree sensor 602, the second opening degree sensor 603 and the third opening degree sensor 604, performs comparison of a target opening degree and an actual opening degree, and judges whether or not a sensor value is normal (step S203). Incidentally, the wording that "the sensor value is normal" indicates that each changeover vale is driven at an operation speed experimentally obtained in advance, or at a speed according to the operation speed. At this time, the ECU 100 judges whether or not the sensor value is normal, by judging whether or not each changeover valve has gone into a target opening/closing state within a time limit calculated on the basis of the operation speed. Incidentally, such an operation is one example of practical aspects associated with the judgment of whether or not the sensor value is normal.

If the sensor value is normal (the step S203: YES), i.e. if the exhaust changeover valve 210, the intake changeover valve 216 and the intake bypass valve 218 have gone into the fully-closed state, the fully-closed state, and the fully-opened state, respectively, within the time limit, then, the ECU 100 ends the engine start control.

Moreover, if the sensor value is abnormal (the step S203: NO), i.e. if at least one of the exhaust changeover valve 210, the intake changeover valve 216 and the intake bypass valve 218 does not go into the target opening/closing state within the time limit, then, the ECU 100 performs fail-safe control (step S204).

Here, the fail-safe control conceptually includes various controls for maximally mitigating a reduction in vehicle performance caused by the sticking, and its practical aspect is not uniquely limited; however, in the embodiment, it firstly indicates (1) storage or memory of the changeover valve which is in the sticking state, (2) notice to the driver, and (3) return to the twin turbo mode.

In (1), it is easy to specify the changeover valve which is in the sticking state from the sensor value of each opening degree sensor, and it is performed by writing information in a proper aspect (e.g. a flag etc.) into a storing device or memory such as a RAM and a flash memory. Moreover, (2) indicates lighting control for lighting a warning lamp etc. placed in a meter hood or on a console panel or the like in advance.

On the other hand, (3) indicates that the changeover valve which is in a normal state is returned into the original opening/closing state, i.e. the opening/closing state corresponding to the twin turbo mode. As a result, with the opening/closing sate of the changeover valve which is in the sticking state, the supercharging mode is return to the twin turbo mode. If the fail-safe control is ended, the engine start control is ended.

As described above, according to the embodiment, at the time of engine stop of the engine 200, the supercharging mode is controlled into the twin turbo mode which is different from the single turbo mode to be selected at the start. Thus, at the start of the internal combustion engine, the driving of the exhaust changeover valve 210, the intake changeover valve 216 and the intake bypass valve 218 is started, half-automatically, every time, in order to obtain the single turbo mode as the supercharging mode to be originally selected.

In other words, the driving of the changeover valves is not performed specially for the sticking detection, but it is merely incorporated into a process for obtaining the optimum supercharging mode which is determined to be selected at the start, originally. Thus, according to the embodiment, extremely efficient sticking detection is realized.

The effect of the embodiment will be explained, more specifically. At the time of engine stop, the vehicle is normally stopped, and the supercharging mode to be originally selected is the single turbo mode. Therefore, if control similar to the engine stop control in the embodiment is not applied, the single turbo mode to be originally selected is already realized at the time of engine stop.

In this case, firstly, as long as forcible driving aimed at the sticking detection is not performed, the sticking detection of the changeover valve is not performed for a while after the start. In order to perform such forcible driving, it is necessary to return the opening/closing state corresponding to the single turbo mode, to the single turbo mode via another opening/closing state (e.g. the opening/closing state corresponding to the twin turbo mode, or the like), which possibly results in a waste of electric power resource required for the driving of each changeover valve. In particular, its influence is significant in the situation that the generated output of the engine 200 is less expected than in the normal time, as in the start.

Moreover, secondly, if the supercharging mode is already the single turbo mode at the start as described above, the supercharging mode to be returned to if the sticking is detected (under the assumption that it is returned) is the single turbo mode. In the single turbo mode, the arrival supercharging pressure is lower than the twin turbo mode, as described above, so that the range of the supercharging pressure which can be adopted by the engine system 10 is remarkably limited. Moreover, if the primary turbo 300 is placed on the premise of the cooperative operation with the secondary turbo 400, its body or constitution is generally small, and it tends to go into the overshoot state in the situation that the twin turbo mode is originally selected, such as at the time of high revolution and high load.

In contrast, as in the embodiment, if the supercharging mode to be returned to when the sticking is detected is the twin turbo mode, the range of the supercharging pressure which can be adopted is wider than in the single turbo mode, and its practical effect is far higher than at the time of the return to the single turbo mode even in consideration of the fact that the response speed of the supercharging pressure is slow. Moreover, in the case of twin turbo mode, there is no problem of the overshoot, etc. described above. In other words, the twin turbo mode is basically the fail-safe side supercharging mode in comparison with the single turbo mode, and it is optimal as the supercharging mode to be selected when the sticking is detected.

As described above, according to the embodiment, all the changeover valves associated with the selection of the supercharging mode are always driven at the engine start, so that the sticking prevention effect can be expected. Moreover, the driving is efficiently performed in with the transition to the single turbo mode, which is the supercharging mode to be selected at the start, and the fail-safe side twin turbo mode is ensured even if the sticking of the changeover valve is detected. Thus, an extremely high benefit in practice, such as reducing an influence on the vehicle driving as much as possible, can be enjoyed.

The present invention is not limited to the aforementioned embodiment, but various changes may be made, if desired, without departing from the essence or spirit of the invention which can be read from the claims and the entire specification. A control apparatus of a vehicle, which involves such changes, is also intended to be within the technical scope of the present invention.

INDUSTRIAL APPLICABILITY

The present invention can be applied to the sticking detection of changeover valves, in a vehicle which is provided with a plurality of superchargers and changeover valves and which is configured to change a supercharging mode associated with the plurality of superchargers by controlling the changeover valves.

The invention claimed is:
1. A control apparatus of a vehicle,
the vehicle comprising:
an internal combustion engine;
a supercharging system including a first supercharger and a second supercharger each of which is driven by an exhaust gas of the internal combustion engine; and
at least one changeover valve which is placed in at least one of an intake passage and an exhaust passage of the inter- nal combustion engine and which changes a supercharging mode associated with the supercharging system among a plurality of supercharging modes including a single supercharging mode for performing supercharging only with the first supercharger and a twin supercharging mode for performing supercharging with both the first and second superchargers, in accordance with an opening/closing state, said control apparatus comprising:

a first controlling device which is configured to control the changeover valve at the time of engine stop of the internal combustion engine such that the opening/closing state is an opening/closing state corresponding to a supercharging mode which is different from a supercharging mode to be selected at the start of the internal combustion engine and which is to be selected in an operating area on a higher-load side than at the start from among the plurality of supercharging modes; and a second controlling device which is configured to control the changeover valve at the start of the internal combustion engine such that the opening/closing state is an opening/closing state corresponding to the supercharging mode to be selected at the start.

2. The control apparatus of the vehicle according to claim 1, wherein the supercharging system is a parallel supercharging system in which each of the first and second superchargers independently performs supercharging, and the changeover valve includes at least an exhaust changeover valve placed in the exhaust passage corresponding to the second supercharger and an intake changeover valve placed in the intake passage corresponding to the first supercharger.

3. The control apparatus of the vehicle according to claim 2, wherein said first controlling device controls each of the exhaust changeover valve and the intake changeover valve to be in a fully-opened state at the time of engine stop, and said second controlling device controls each of the exhaust changeover valve and the intake changeover valve to be in a fully-closed state at the start.

4. The control apparatus of the vehicle according to claim 1, further comprising:

a specifying device which is configured to specify the opening/closing state; and a judging device which is configured to judge whether or not the changeover valve is in a sticking state on the basis of the specified opening/closing state when the opening/closing state is controlled, at the start, to be in the opening/closing state corresponding to the supercharging mode to be selected at the start.

* * * * *